United States Patent [19]

Krishnakumar et al.

[11] Patent Number: 5,067,104

[45] Date of Patent: Nov. 19, 1991

[54] PROGRAMMABLE PROTOCOL ENGINE HAVING CONTEXT FREE AND CONTEXT DEPENDENT PROCESSES

[75] Inventors: Anjur S. Krishnakumar, Warren; Bala Krishnamurthy, Morganville; Krishan K. Sabnani, Berkeley Heights, all of N.J.

[73] Assignee: AT&T Bell Laboratories, Murray Hill, N.J.

[21] Appl. No.: 45,904

[22] Filed: May 1, 1987

[51] Int. Cl.[5] .................... H04J 3/12; G06F 3/00; G06F 13/10; G06F 13/14

[52] U.S. Cl. .................................. 395/375; 364/919; 364/926.9; 364/926.93; 364/927.99; 364/935.2; 364/940.61; 364/973; 364/975.1; 370/110.1; 364/DIG. 2

[58] Field of Search ... 364/200 MS File, 900 MS File; 379/98; 370/85.2, 94.1, 110.1, 60, 60.1, 99.1

[56] References Cited

U.S. PATENT DOCUMENTS

| | | | |
|---|---|---|---|
| 4,241,398 | 12/1980 | Carll | 364/200 |
| 4,298,959 | 11/1981 | Sundermeyer et al. | 364/900 |
| 4,386,416 | 5/1983 | Gilfner et al. | 364/900 |
| 4,393,501 | 7/1983 | Kellogg et al. | 364/200 |
| 4,412,285 | 10/1983 | Neches et al. | 364/200 |
| 4,435,758 | 3/1984 | Lorie et al. | 364/200 |
| 4,476,347 | 10/1984 | Hagen et al. | 178/3 |
| 4,625,308 | 11/1986 | Kim et al. | 370/110 |
| 4,677,611 | 6/1987 | Yanosy, Jr. et al. | 370/85.2 |
| 4,742,466 | 5/1988 | Ochioi et al. | 364/200 |
| 4,763,317 | 8/1988 | Lehman et al. | 370/58 |
| 4,821,265 | 4/1989 | Albal et al. | 370/94.1 |

OTHER PUBLICATIONS

Green, "Protocol Conversion", IEEE Tran. Comm., vol. COM-34, No. 3, Mar. 1986, pp. 257-268.

Bechmann et al, "Formal Methods in Communication Protocol Design", IEEE Tran. Comm., vol. COM-28, No. 4, Apr. 1980, pp. 624-631.

"Document Interchange Unit Parser for Multiple Data Processing Architectures", IBM TDB, vol. 29, No. 2, Jul. 1986, pp. 939-942.

"A Standard Layer Model", H. Zimmerman, Computer Networks Architectures and Protocols, Chapter 2, Paul Green (Editor), Plenum Press, 1983.

"Implementation of a Transport Protocol in an Assembly Language", F. M. Restrorick, Protocol Specification, Testing, and Verification, III (H. Rudin and C. West, Editors), North-Holland, 1983.

"A Stream Input-Output System", D. M. Ritchie, AT&T Bell Laboratories Technical Journal, Oct. 1984, vol. 63, No. 8, Part. 2.

"A VLSI Link-Level Controller", A. A. Avanessians et al., Proceedings of ISSCC 84, Feb. 1984.

*Primary Examiner*—Thomas C. Lee
*Attorney, Agent, or Firm*—Henry T. Brendzel

[57] ABSTRACT

In a programmable protocol engine, a core central processor implements a plurality of programmable finite state machines that perform context-dependent operations, and programmable satellite processing units that perform context-free operations. To assist in buffering the two way communications of the protocol engine, a memory is included which interacts with the central processor and the satellite units. The programmability of the protocol engine is achieved by realizing the satellite units with combinations of a processing unit and a memory unit which stores the instructions to be performed by the corresponding processing unit. The sequence of instructions to be performed is drawn from a small unique set of instructions which are adapted particularly to the tasks associated with protocol implementations. Instruction ports are provided for loading the necessary instructions to the satellite units and the central processor, thereby implementing a chosen protocol. To permit use of the protocol engine in environments where a plurality of users are multiplexed onto a single physical link, additional means are provided for storing the state of the finite state machines within the central processor, and for restoring the finite state machines to a previously stored set of states.

13 Claims, 6 Drawing Sheets

PROGRAMMABLE PROTOCOL ENGINE HAVING CONTEXT FREE AND CONTEXT DEPENDENT PROCESSES

BACKGROUND OF THE INVENTION

This invention relates to data communications and, more particularly, to data communication protocols.

Recent advances in fiber optics have resulted in several orders of magnitude increase in the transmission bandwidth of communication channels. Utilization of the available bandwidth, coupled with the trend towards integration of information and communication services, requires handling of high speed traffic sources over widely dispersed networks. This means that communication processing generally, and handling of communication protocols in particular, must be done much faster than before. Currently, the only cost effective way of achieving such high speeds is through the use of specialized circuits. Such circuits are often realized with VLSI integrated circuits.

Generating VLSI designs directly from traditional protocol specifications is very expensive. Since there are several levels of abstraction between protocol specifications and the VLSI designs, a major redesign is required every time a change in the protocol is introduced. Further, most protocols are currently specified in the English language, and that condition introduces the normal ambiguities present in natural languages. Consequently, implementations of a protocol by two different manufacturers may be incompatible, and correcting errors due to the misinterpretation of the protocol specifications is very expensive.

On a different level, the available bandwidth and the ease of digital communication has encouraged the growth of data networks. This growth spawned a number of different protocols that were designed by independent concerns. Alas, these protocols were not designed to be compatible with each other, resulting in the existence of various networks that cannot communicate with one another. To facilitate such communication, it became necessary to design gateways which act as data transmission bridges between such networks. Efficient design of such gateways requires a standard reference model for describing communication protocols and this led to the seven-layered protocol model known as ISO-Open Systems Interconnect Model. Hubert Zimmerman, "A Standard Layer Model," Chapter 2, Computer Networks Architectures and Protocols, Paul Green (Editor), Plenum Press, 1983. The model specifies an orderly progression of protocol components from the top, application layer presented to the users, to the bottom, physical layer of the communications channel.

A large number of protocol implementations use special purpose processors that are program controlled. One such arrangement is described, for example, in U.S. Pat. No. 4,298,959 issued to F. D. Sundermeyer, et al. on Nov. 3, 1981. Many others are implemented with general purpose processors, in a uni-processor architecture and under software program control. Such software programs have ranged from monolithic code that implements the entire protocol as a single routine, to fairly complex collections of software modules. Examples of such arrangements are found in F. M. Restrorick, "Implementation of a transport protocol in an assembly language," Protocol Specification, Testing, and Verification, III (H. Rudin and C. West, Editors), North-Holland, 1983, and D. M. Ritchie, "A Stream Input-Output System," AT&T Bell Laboratories Technical Journal, October 1984, Vol. 63, No. 8, Part 2. Some of the more recent protocol implementations have been created in VLSI embodiments in order to achieve desired operating speed, but those designs basically realize custom special purpose circuits. One such implementation is described, for example, by A. A. Avanessians et al. in "A VLSI Link-Level Controller," Proceedings of ISSCC 84, February 1984.

The known VLSI protocol embodiments differ only in the extent to which the protocol functions are embedded in silicon (i.e. the partitioning of functions between silicon and software), and in the specific protocol that they implement. Typically, they implement a specific ISO layer or a fraction thereof, and are often not based on a formal description of the protocol functions. Consequently, these VLSI designs are often inflexible, necessitating a complete redesign when modifications need to be introduced. The lack of formalism also leads to difficulties in design validation.

SUMMARY OF THE INVENTION

To provide for more effective communication between networks employing different protocols, the subject invention provides a programmable protocol engine. This protocol engine comprises a core central processor that has a plurality of programmable finite state machines that operate concurrently and interact with one another. Interfacing with the core central processor are satellite processing units that perform low level operations that deal, for example, with the format of the incoming and outgoing messages. To assist in buffering the two way communications of the protocol engine, a memory is included which interacts with the central processor and the satellite units.

The programmability of the protocol engine is achieved by realizing the satellite units with combinations of a processing unit and a memory unit which stores the instructions to be performed by the corresponding processing unit. The sequence of instructions to be performed is drawn from a small unique set of instructions which are adapted particularly to the tasks associated with protocol implementations. Instruction ports are provided for loading the necessary instructions to the satellite units and the processor unit, thereby implementing a chosen protocol.

To permit use of the protocol engine in environments where a plurality of users are multiplexed onto a single physical link, additional means are provided for storing the state of the finite state machines within the processor unit, and for restoring the finite state machines to a previously stored set of states.

DETAILED DESCRIPTION

Figure 1:
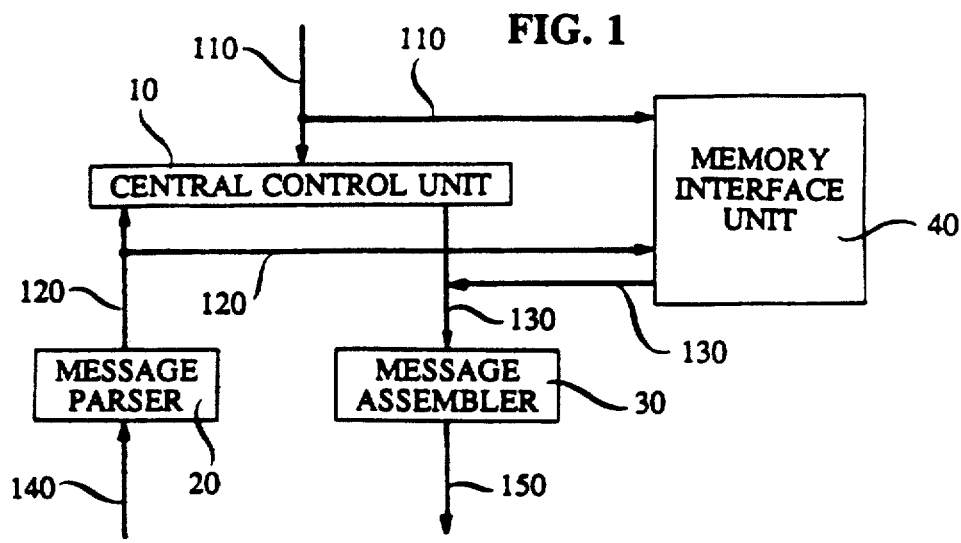
FIG. 1 presents the general block diagram of the programmable protocol engine of our invention.

FIG. 1 presents a general block diagram of our protocol engine. Bus 110 and buses 150 and 140 are the interfaces between the protocol engine and the other portions of a network station implementation. In the context of the seven-layer ISO model, bus 110 is the interface to the level immediately above the level being implemented by the protocol engine, while buses 150 and 140 form the interface to the next lower level.

The operation of the protocol engine can be thought as comprising a kernel portion and a shell portion. The kernel portion of the protocol captures the overall coordination among different protocol parties. The kernel portion is the context dependent portion. The shell portion of the protocol provides for the low-level details, such as message formats and timer operations. The shell portion is the context free portion.

The protocol engine architecture of FIG. 1 reflects this approach. The kernel is implemented by central controller unit 10, while the shell is implemented by message parser 20, message assembler 30, and memory interface unit 40. Bidirectional bus 110 is connected to central control unit 10 and to memory interface unit 40. Central control unit 10 and memory interface unit 40 interact with message parser 20 via bus 120, and with message assembler 30 via bus 130. Message parser 20 receives information from bus 140, while message assembler 30 delivers information to bus 150.

The information received by message parser 20 is in the form of message packets. Each packet contains a known set of fields, commonly referred to as tokens, and the information in each field has a predefined meaning within the particular protocol that is employed. The received message packets are parsed in parser 20 according to a set of rules specified for the protocol employed, as a context-free grammar. The parser does not deal with the meaning of the received bit patterns within the tokens.

Message assembler 30 performs the reverse function. It receives message tokens from central control unit 10 and/or from memory interface unit 40 and assembles them into complete messages that are delivered to bus 150.

One feature of our invention is the very efficient realization of the parser and assembler units. The realization, described in more detail below, can be thought of as a programmable, special purpose, engine. It inherits its efficiency and its high processing speed from its special purpose processor which operates under control of a very small set of efficient primitive instructions. It inherits its versatility from the fact that the processor operates under program control.

For sake of simplicity FIG. 1 abstains from showing various secondary signals and ports, such as the clock signals and the start/stop signals, as well as the port through which the protocol engine is programmed. The use of these signals is well understood to persons skilled in the art but, notwithstanding, some of these signals are shown in subsequent drawings.

Figure 2:
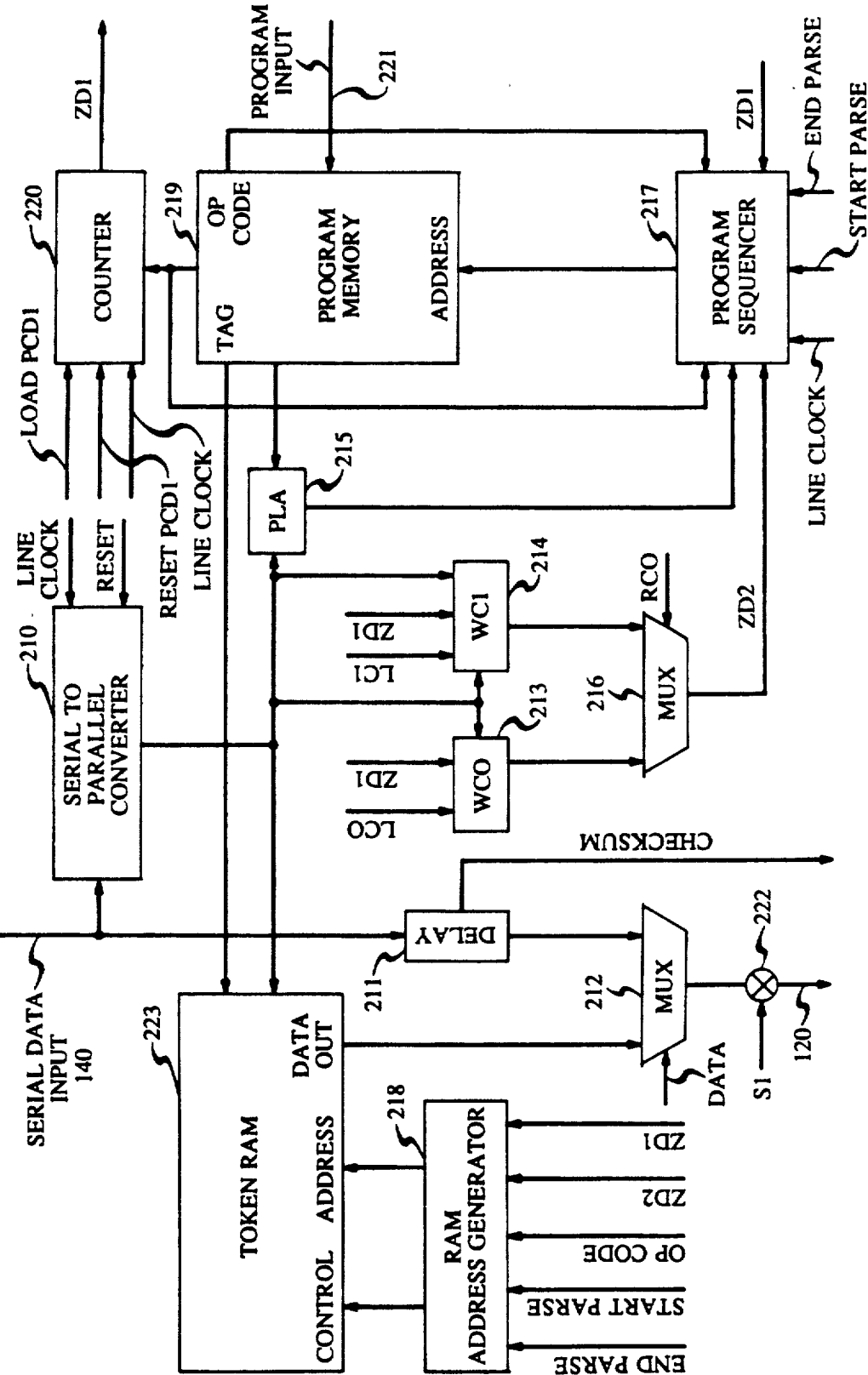
FIG. 2 presents a detailed block diagram of the FIG. 1 parser.

FIG. 2 presents a block diagram of the processor employed in parser 20. Data flows into parser 20 via bus 140, where it enters serial-to-parallel converter 210 and delay register 211. The serial output of register 211 is applied to multiplexer 212, while the parallel output of register 211 is applied to a checksum output of parser 20. The output of converter 210 is applied to token RAM 223, WC0 counter 213, WC1 counter 214, and PLA 215. PLA 215 is a programmable logic array decoder employed in connection with branching, as described below. Counters 213 and 214 are down-counters that accept data under control of load signals lc0 and lc1, respectively. They count down in response to signal zd1 and when they reach zero, an output is developed which is selected by multiplexer 216 under control of signal rc0. The selected counter's output signal, zd2, is applied to program sequencer 217, and to token RAM address generator 218. The output of PLA 215 is also applied to sequencer 217.

Sequencer 217 controls the overall operation of parser 20 through its interaction with program memory 219. In combination, elements 217 and 219 form a finite state machine that is defined by the contents of memory 219. In addition to the output signal of PLA 215 and to signal zd2, sequencer 217 is responsive to an "op-code" sub-word from memory 219, to a field length sub-word from memory 219, and to a zd1 signal from down-counter 220. It is also responsive to a line clock signal, a "start parse" signal and a "end parse" signal. The latter three control signals are provided to message parser 20 from control circuits outside the parser (not shown explicitly in FIG. 2).

Memory 219 receives its program contents from bus 221 in the FIG. 2 embodiment. It is possible, of course, to employ a read-only memory 219 instead of a RAM, thereby obviating the need for bus 221. Memory 219, which is addressed by sequencer 217, outputs words with four sub-words, or components. One component contains tag information that is applied to token RAM 223. The tags are employed to direct the tokens to different ones of the finite state machines in the central control unit. Another component contains the "op-code" which represents the operation that is to be performed. The op-code is fed to sequencer 217 and to address generator 218. A third component, applied to PLA 215, contains information that directs the branching information. The fourth component contains a field length specification which is applied to down-counter 220 and to sequencer 217. Counter 220 accepts the applied field length specification under control of "load pdc1" signal from sequencer 217. It counts down with applied clock pulse, and when it reaches zero it develops output signal zd1 which is fed to sequencer 217, to WC0 and WC1 counters, and to address generator 218. Sequencer 217 also develops the lc0 and lc1 signals for WC0 and WC1 counters, and a "reset pcd1" signal that is used to reset counter 220.

Address generator 218 controls token RAM 223 via address and control lines. The output of RAM 223 is applied to multiplexer 212 where either the output of RAM 223 or the output of delay register 211 is selected under the influence of "data" control signal from sequencer 217. The output of multiplexer 212 is passed to the output of parser 20 through gate 222 which is controlled with control signal S1 from sequencer 217.

The operation of the FIG. 2 parser 20 is as follows. In response to the "start parse" signal, sequencer 217 applies to memory 219 an address that corresponds to the start of the parsing program in the memory. Memory 219 outputs a word, and the field length component of the word indicates the number of bits that define the first token. That number is applied to counter 220 and counted down with each clock. By the time counter 200 reaches zero, converter 210 accumulates the required number of bits and, whereupon, sequencer 217 loads the token available in converter 210 into token RAM 223 (through its control of address generator 218) and into counter 213 or counter 214, if specified by signals lc0 or lc1, respectively. Tag information available at the output of memory 219 is concatenated to the token prior to loading it into RAM 223. Converter 210 is then cleared with a "reset" signal from sequencer 217. Sequencer 217 then generates the next address for memory 219, resulting in another word being provided at the output of memory 219, which controls operations as described above.

In accordance with some protocols, it is possible to specify that what follows is a sequence of tokens which belong to a group. That sequence may have a known number of tokens, or an indeterminate number of tokens. A sequence of a known number of tokens is specified by a first token identifying the expected number. Such a first token is placed in the WC0 or WC1 counter, and the counter is decremented with each reception of a subsequent token (through the signal zd1). End of the sequence is signified by signal zd2, which becomes active when counter WC0 or WC1 reaches zero. End of an unbounded sequence of tokens is signified by the "end parse" control signal.

Delay register 211 is interposed in the path between the input of line 140 and multiplexer 212 for the purpose of efficient implementation of an error-checking process. Commonly, message packets are sent with a trailing token that characterizes the message. Such a token may be created, for example, in accordance with the conventional CRC (Circular Redundancy Code) code. In systems that employ such a trailing token, the incoming message is applied to an integrity circuit concurrently with the application of message packets to parser 20. The integrity checking circuit develops a token that, in the absence of errors, is identical to the trailing token of the message packet. In accordance with the FIG. 2 embodiment, as soon as the message packet has been applied to parser 20 in its entirety, the external integrity checking circuitry token can be compared (externally to parser 20) to the token found in delay register 211. The checksum output of delay register 211 permits quick comparison of the two tokens.

Most protocols need the capability to branch into one of a number of paths in a manner that is similar to the "switch" construct in the C language. The desired path to be taken is specified by the contents of a token. For example, the token specifying the branch options could be 4 bits long, permitting the specification of a branch to any one of 16 paths. When all 16 branch directions are permissible, we say that the branch token is in canonical form. That is, each possible value of the token corresponds to a permissible path. Some protocols employ branch tokens that are not of canonical form. That is, there may be, for example, only three possible branch paths, but the token employed is 4 bits long. In such instances the branch paths are specified by only some of the possible states, as for example, 0001, 0011 and 1001. The challenge, from a hardware implementation standpoint, is to utilize the four bit information efficiently. PLA 215 performs this function by converting non-canonical branch representations to canonical form. In the above described example, the PLA 215 conversion would take the form of 0001→01,0011→10, and 1001→11. In this manner, the output of PLA 215 can be used to effect the branch operation by simply employing it as an offset to the address applied to memory 219. The offset addresses in memory 219 contain pointers to other portions in memory 219 which correspond to the appropriate paths of the protocol. Of course, in some applications PLA 215 may be unnecessary.

Figure 3:
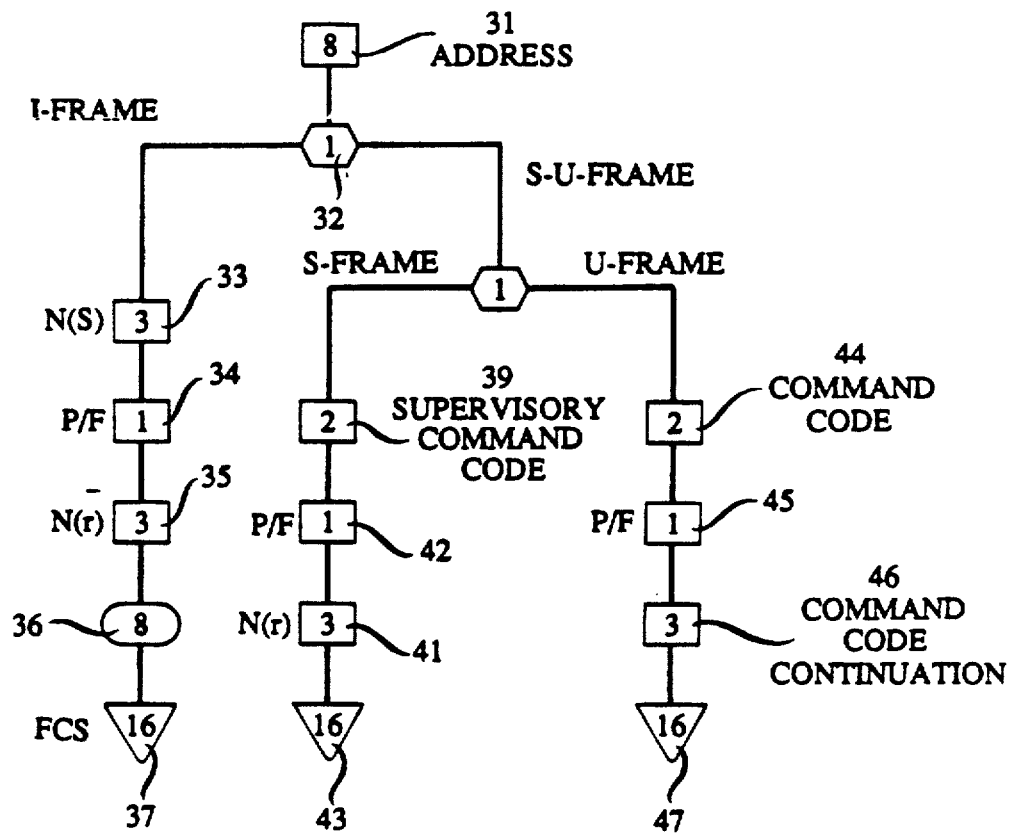
FIG. 3 illustrates a parser message format in the form of a flowchart.

FIG. 3 presents an example of a message format specification that may be parsed with the FIG. 2 parser 20. This format corresponds to what is known as the LAPB (Link Access Procedure-B) protocol. Block 31 in FIG. 3 represents the first token in the message. It indicates that the token is 8 bits long and contains an address. Block 32 represents a branch token which is 1 bit long. It identifies the message packet as an I-Frame (information frame), or a S-U-Frame (supervisory or command frame). Following the I-Frame path, the next token is 3 bits long (block 33) and it represents the sender's sequence number, N(s). This sequence number relates to the entire message packet and it permits a subsequent process to identify, for example, when a previous message packet was not received. Subsequent to the sequence number token is a 1 bit Poll/Final (P/F) token (block 34), which is a bit used in the protocol sequence. It is followed by a 3 bit receiver sequence number token, N(r), (block 35). The ellipse 36 shown in FIG. 3 indicates repeating tokens having 8 bits each. Finally, triangular block 37 specifies a 16 bit token that corresponds to the checksum of the message.

Proceeding down the S-U-Frame path from branch token 32, the next token (block 38) is also a 1 bit branch token and it identifies whether an S-Frame or a U-Frame is arriving. When the S-Frame path is followed, the next token contains 2 bits (block 39) which yield the supervisory command code. The next 1 bit token (block 42) is the P/F token, and it is followed by an N(r) 3 bit token (block 41). Block 41 is followed by the 16 bit checksum token (block 43). When the U-Frame path is followed, the next token contains 2 bits (block 44) which yield the command code. The next token is the 1 bit P/F token (block 45), which is followed by a command code continuation token of 3 bits (block 46). The path ends with the 16 bit checksum token (block 47).

In addition to the branch instruction described above, the FIG. 2 parser 20 includes seven additional instructions, as shown in Table 1 below.

TABLE 1

| | Instruction Set of the Message Parser | |
|---|---|---|
| Opcode | Instruction | Operation |
| 0 | rff #n | Read a fixed field of length n bits |
| 1 | ep | End parse |
| 2 | lc0 #n | Load counter wc 0 with n bits from the input |
| 3 | lc1 #n | Load counter wc 1 with n bits from the input |
| 4 | rc0 #n | Read number of words of n bits each per WC0 |
| 5 | rc1 #n | Read number of words of n bits each per WC1 |
| 6 | rvf #n | Read unspecified number of n bit words |
| 7 | br #n to,t1,...,tm | Branch based on the next n bits to target $t_i$ |

For most protocol implementations we have been able to perform the necessary parser functions with only four basic instructions; to wit: rff, br, ep, and rvf. However, for some of the more complex protocols this small set of basic instructions was found to be insufficient and, therefore, we increased the op-code by 1 bit, and the set of basic instructions from 4 to 8.

Corresponding to the above-described 8 basic instructions of the FIG. 2 parser, address generator 218 interprets those instructions in accordance with Table 2 below, and sequencer 217 interprets those instructions in accordance with Table 3 below.

TABLE 2

| Opcode | Instruction | Operation |
|---|---|---|
| 0 | rff #n | After word is loaded, increment RAM write address. Signal zd1 indicates collection completion. |
| 1 | ep | Increment address from zero to value in the shadow address register in element 218. |
| 2 | lc0 #n | After the length is loaded into the register and the RAM, increment address. |
| 3 | lc1 #n | After the length is loaded into the register and the RAM, increment address. |
| 4 | rc0 #n | After every n-bit word is read and written into memory, increment RAM address and decrement registers lc0, lc1. |
| 5 | rc1 #n | After every n-bit word is read and written into memory, increment RAM address and decrement registers lc0, lc1. |
| 6 | rvf #n | After every n-bit word is read and written into memory, increment RAM address and decrement registers lc0, lc1. |
| 7 | br #n t0,t1, . . . , t_m | Store the branch pattern and increment RAM address |

TABLE 3

| Description of the address Generator for the ROM | | |
|---|---|---|
| Opcode | Instruction | Operation |
| 0 | rff #n | After word is loaded, increment ROM address register in 217 by 1. |
| 2 | lc0 #n | After word is loaded, increment ROM address register in 217 by 1. |
| 3 | lc1 #n | After word is loaded, increment ROM address register in 217 by 1. |
| 4 | rc0 #n | Increment ROM address reg as soon as signal zd2 becomes active. |
| 5 | rc1 #n | Increment ROM address reg as soon as signal zd2 becomes active. |
| 6 | rn1 #n | After end-of-packet signal is received, reset ROM address register in 217 to zero. |
| 7 | br #n t0,t1, . . . , t_m | Add offset, which contains the address of next instruction to be executed. |

Address generator 218 and sequencer 217 were easily implemented with very conventional circuitry, in accordance with the specifications in the tables above. As designed, parser 20 is extremely efficient. The branch instruction is the slowest instruction, but still, it takes only four clock periods to complete. Thus, a CMOS implementation of the parser (which can be easily operated at 10 MHz) allows the handling of 2.5 Mbits/s input streams. This is much faster than with currently available protocol engines.

Assembler 30 is very similar to parser 20. It basically performs the reverse operation of parser 20 in that it receives a sequence of tokens and it assembles the tokens into a message packet. Not unexpectedly, the architecture of assembler 30 is very similar to that of parser 20, as is evident from the block diagram of assembler 30 depicted in FIG. 4.

Figure 4:
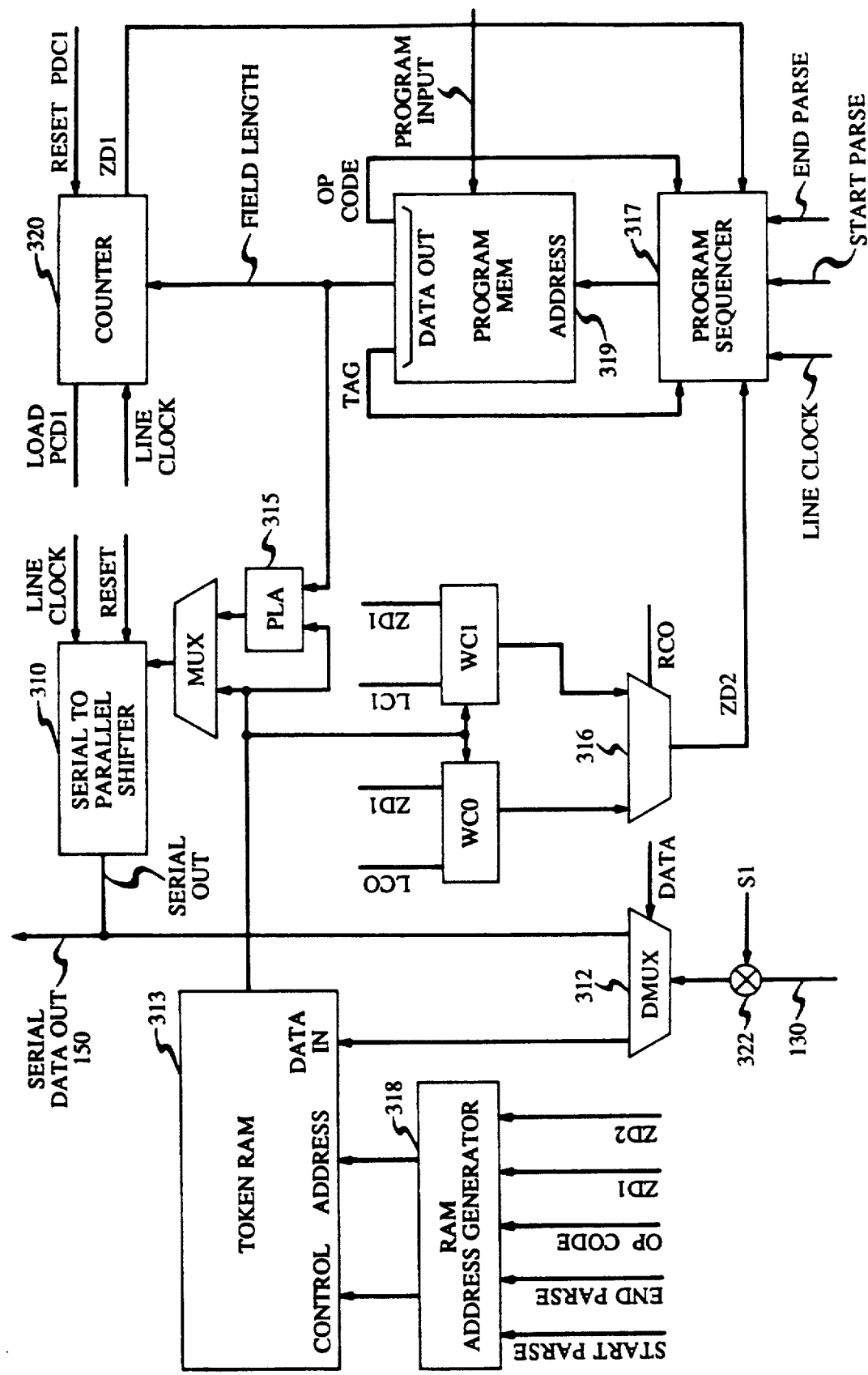
FIG. 4 presents a detailed block diagram of the FIG. 1 assembler.

Briefly reviewing FIG. 4, data from bus 130 enters through switch 322 after which it is either stored in token RAM 313 or is delivered to serial output bus 150. The alternate routing is controlled with multiplexer 312. Tokens that have been stored in RAM 313 are read out, as appropriate, (under control of the op code applied to RAM address generator 318) and applied to shift register 310, counters WC0 and WC1 (if specified by control signals 1c0 and 1c1) and PLA 315. The clock signal shifts the information stored in register 310 onto bus 150. The operation of assembler 30 is controlled by sequencer 315 in combination with the program stored in memory 319 and the control signals provided by PLA 315, counter 320 (signal zd1) and multiplexer 316 (signal zd2).

Protocol operations performed in a typical ISO layer involve the addition of header information, or the interpretation of header information and subsequent action based thereon. The bulk of the flowing message, however, is passed through from one end to the other unaltered. In some circumstances information needs to be buffered in the course of passing through an implemented protocol layer. In order to minimize the buffer space required at each layer, in accordance with our invention most of the information in the message is stored (for reception or for transmission) in memory at a higher layer of the protocol. This approach is taken because the higher levels of protocols are often implemented with a host computer where memory is plentiful. Memory interface unit 40 performs the task of storing or retrieving the information stored in the host computer's memory and keeping track of where the data is stored. Unit 40 is realized with a memory where pointers are stored, and with means for accessing the host computer's memory. The operations of memory interface unit 40 are controlled by central control unit 10 through a control bus, to be described below. The status of the memory unit affects the operation of the central control unit, also through the control bus. By "status of the memory unit" we mean, among others, the indication that the allocated space in the host computer is either full, empty, or partially full.

The central controller unit (CCU) of FIG. 1, as mentioned earlier, performs the kernel functions of the protocol. It performs those functions by modeling the required protocol as a collection of communicating sequential processes that interact with each other through synchronous message exchanges. The processes are implemented with a corresponding collection of finite state machines. This approach has an advantage over modeling of the protocol as a single finite state machine, because complexity is reduced and advantage is taken of the natural separation between the processes. Consequently, our apparatus is more flexible with respect to realization of different protocols.

Figure 5:
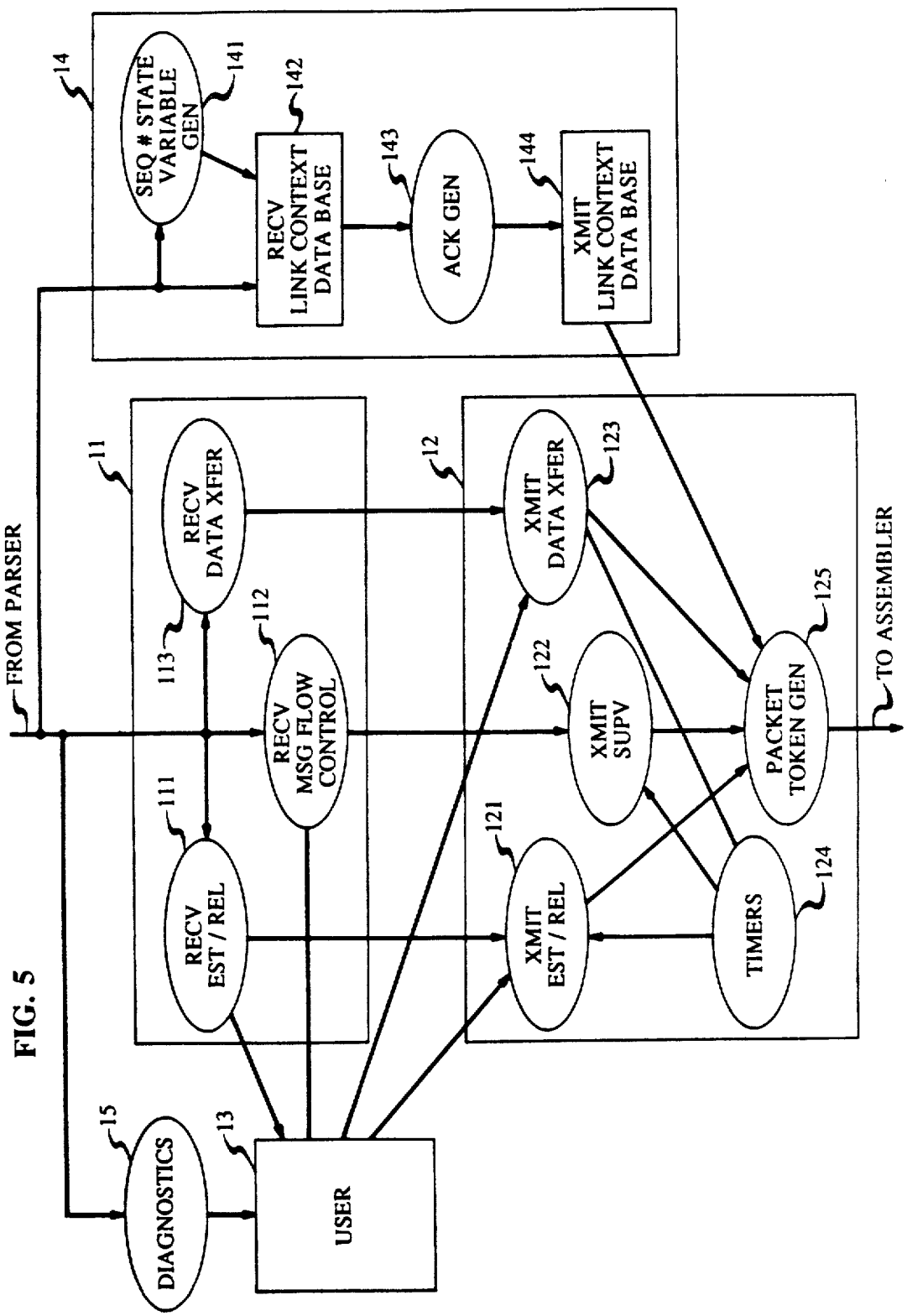
FIG. 5 depicts the processes withing the central control unit of FIG. 1, and the partitioning of these processes.

Modeling of the CCU as a collection of communicating processes is illustrated in FIG. 5. In accordance therewith, the CCU comprises of a transmitter process 11, a receiver process 12, a user interface process 13, a connection context data base process 14, and a diagnostic reporting facility process 15. The operations performed by the transmitter and receiver processes are for the most part complementary in nature. While the transmitter process generates the different fields that constitute the packet, the receiver process performs analysis on the tokens generated by the message parser. It may be noted that both the receiver process (12) and the transmitter process (11) can each be viewed as comprising three subprocesses (and implemented accordingly), with one relating to the establishment and release of connections, a second one relating to control information flow, and the third relating to data flow.

More specifically, receiver process 11 comprises an establish/release process 111, a message flow control process 112, and a data transfer process 113. Process 111 receives information from the parser and sends information to process 13 and to transmitter establish/release process 121 in transmitter process 12. Process 112 receives information from the parser and from process 13, and sends information to transmitter supervision process 122 in process 12. Data transfer process 113 receives information from the parser and sends information to transmitter data transfer process 123 in process 12. Processes 121 and 123 receive information from the user. A timer process 124 in process 12 provides information to processes 121, 122, and 123, and a token generation process 125 accepts information from processes 14, 121, 122, and 123 and delivers information to the assembler. Diagnostics 15 receives information from the parser and it may send information to the user process. Connection context data base process 14 also receives information from the parser and it comprises a sequence number and state variable generator process 141 which supplies information to a receiver link context database 142. Database 142 also receives information from the parser, and it delivers information to acknowledge generator process 143. Process 143 supplies information to transmitter link context database 144. Databases 142 and 144 are utilized in connection with the use of the protocol engine in a multiplexed environment, where one physical link supports the multiplexed communications of many logical links. In the case of non-multiplexed links, these databases contain only one entry and may be stored locally in the processes themselves. In a multiplexed environment, the information will be stored in a separate memory that is accessed by the CCU.

The FIG. 5 model is based on a specific partition of the protocol kernel functions, where each kernel function is mapped to a unique finite state machine. Our specific partitioning was driven by two requirements: maximal independence of subsets, and minimal communication among the subsets. Of course, other partitions may suggest themselves to different artisans.

Figure 6:
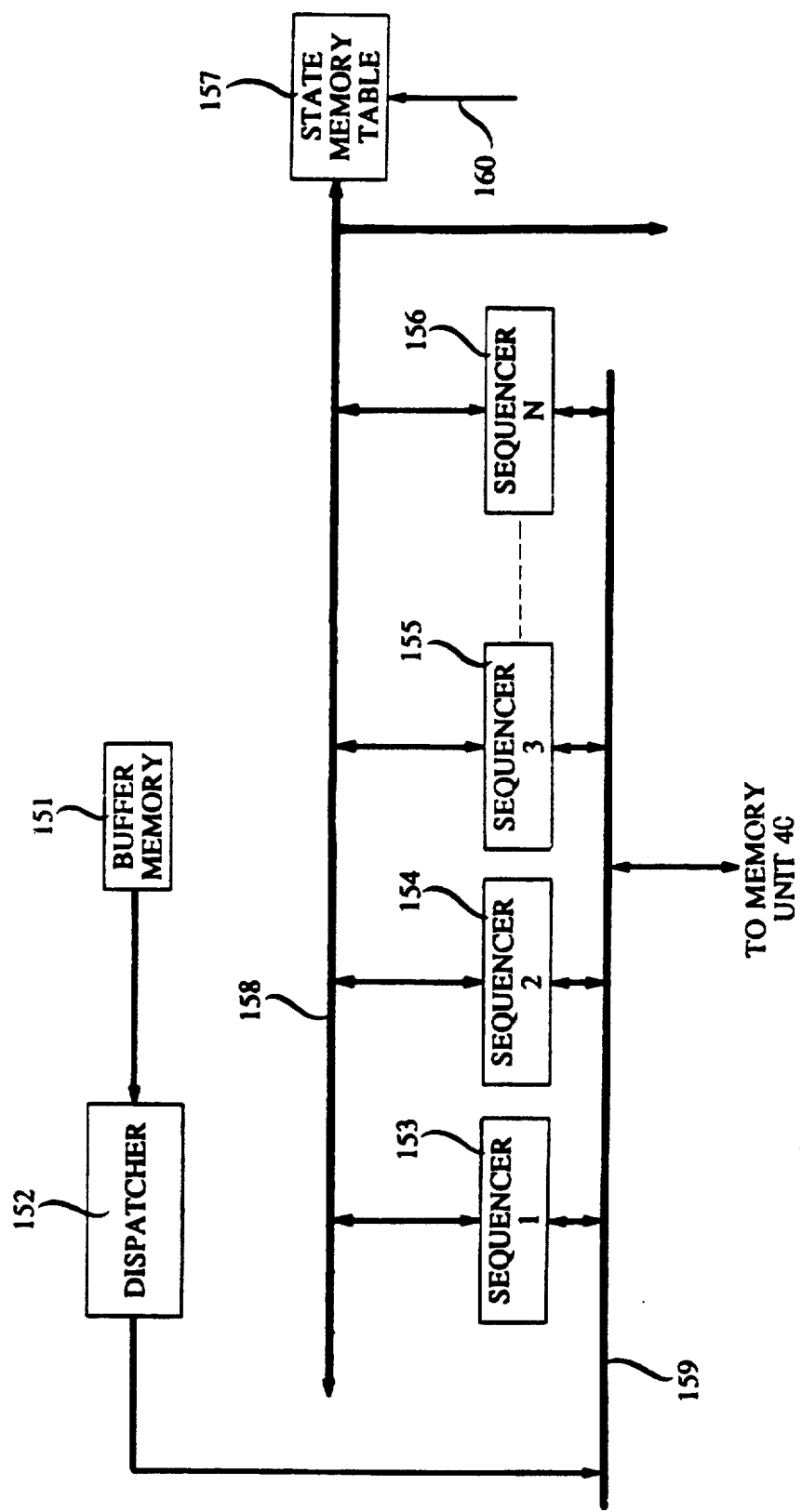
FIG. 6 illustrates the block diagram of our multiple, communicating finite state machine embodiment for the central processing unit.

Having partitioned the protocol into kernel functions and then having allocated each function to a finite state machine, one can then combine a number of the functions into a smaller number of finite state machines. FIG. 6 presents a block diagram of our CCU which realizes the various finite state machines in a very efficient manner. Basically, it comprises a number of sequencers (153-156) that work in conjunction with a memory 157 through data bus 158 to form the finite state machines. The memories associated with the various sequencers are coalesced into a single state table memory 157, which has the advantage of accommodating finite state machines of various sizes. That is, while for some protocols one finite state machine requires a large state table memory while another one requires a smaller state table memory, for another protocol the situation may be reversed. The use of a single memory allows for easy change in the demarcation between the various memories. This memory is also used to store the data bases (142 and 144 in FIG. 5).

More specifically, the FIG. 6 CCU accepts input signals from parser 20 and places the received tokens into buffer memory 151. Memory 151 is employed for the following reasons. First, parser 20 is much faster than the CCU, and it therefore makes sense to allow a single parser to feed information to more than one CCU. Second, and somewhat related to the above, the incoming data rate is bursty and the CCU is benefited from the "averaging" action that buffer memory 151 provides. Third, in some applications the physical link is multiplexed among a number of logical links. Buffer memory 151 facilitates the orderly processing within the CCU (allowing, for example, one finite state machine to process a function of one logical link, while another finite state machine is processing a function of another logical link).

The output of memory 151 is applied to dispatcher 152, whose function is to send tokens to the appropriate sequencers for processing. It casts the tokens upon a data bus 159 to which all of the sequencers are connected. Sequencers 153, 154, 155, and 156 are connected in parallel to bus 158 and to bus 159. Bus 159 is the control bus through which communication between the finite state machines and memory interface unit 40 is effected. Memory 157 may be a read-only-memory or a conventional read-write memory with an input port 160 through which the CCU can be made to realize different protocols. Data bus 158 also comprises the output port of the CCU.

Figure 7:
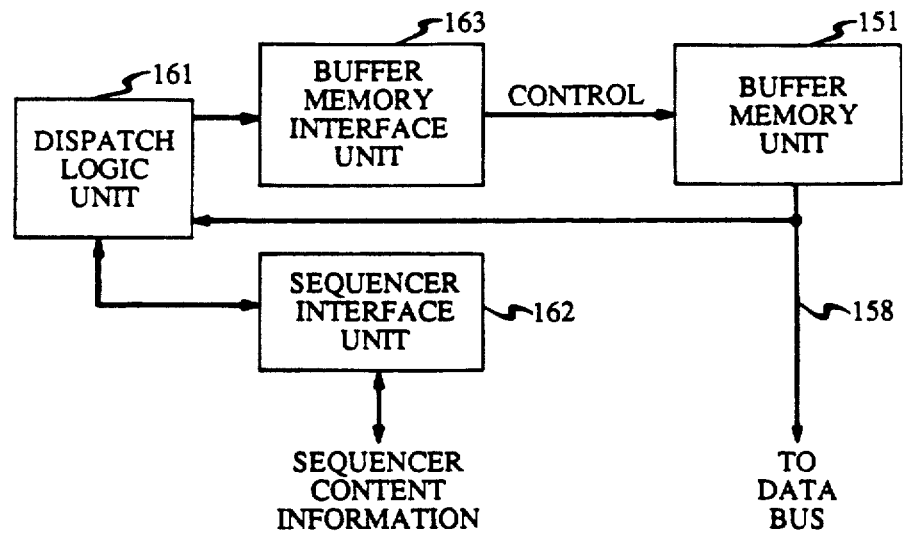
FIG. 7 elaborates on the dispatcher employed in the FIG. 6 embodiment.

As indicated above, dispatcher 152 picks the appropriate message from buffer memory 151 and sends it to the appropriate sequencer for processing. As shown in FIG. 7, it comprises a dispatch logic unit 161, a sequencer interface unit 162, and a buffer memory interface unit 163 communicating with buffer memory unit 151. The sequencer interface unit receives information concerning the status of the different sequencers in the CCU (through signal lines, in parallel with data bus 158). Based on this information and the message token, the dispatch logic unit generates the appropriate control signals via the buffer memory interface unit to bring out of memory 151 the next word to be processed onto bus 158.

Figure 8:
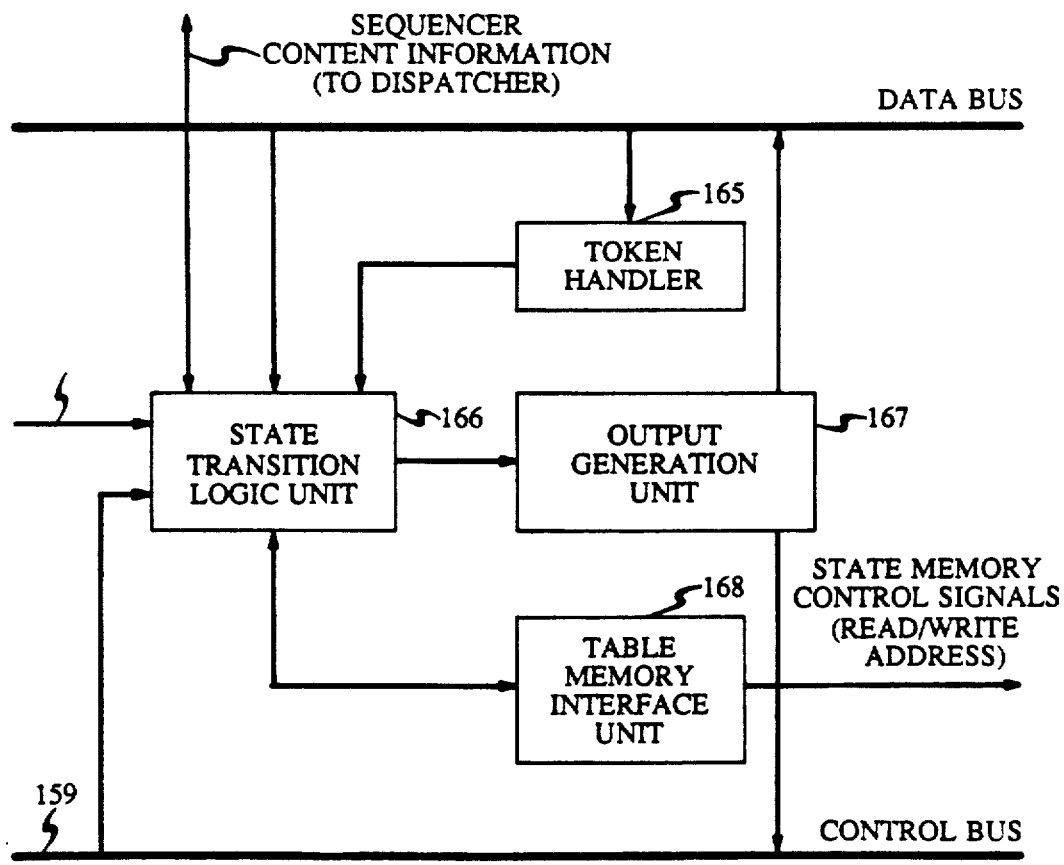
FIG. 8 elaborates on the sequencer employed in the FIG. 6 embodiment.

The finite state machine sequencers (153-156), operating in conjunction in memory 157, implement the finite state machines comprising the CCU. FIG. 8 depicts one embodiment of such a sequencer. In FIG. 8, input tokens are applied to a token handler 165 via bus 158. Token handler 165 identifies tokens to be acted upon and delivers them to a state transition logic unit (STLU) 166. STLU 166 receives control signals via bus 159, and through output generation unit 167, STLU 166 generates output signals to both control bus 159 and data bus 158, as appropriate. Table memory interface unit 168, under control of STLU 166, provides appropriate control signals to obtain transition table entries from the memory 157. Signals indicating input events are also provided to STLU 166 from the user process, as depicted in FIG. 5. Communications with other sequencers are effected through control bus 159, as indicated above.

What is claimed is:

1. A protocol engine comprising:
   a programmable message parser connected to a first interface, including a port for programming said message parser, and responsive to incoming message signals from said first interface for parsing said incoming message into outgoing message component signals;
   a programmable message assembler, including a port for programming said message assembler, connected to said first interface for assembling incoming message component signals from an internal interface to form outgoing message signals for said first interface; and
   a central control unit coupled to said message parser, to said message assembler at said internal interface, and to a second interface, for affecting communications between said first interface and said second interface by receiving said outgoing messages of said programmable message parser, modifying them in accordance with alterably installed transmission and signaling rules of a predefined protocol to develop a message packet and applying the message packet to said second interface, by receiving a message packet from said second interface, modifying it in accordance alterably installed with transmission and signaling rules of a predefined protocol to develop said incoming message component signals.

2. The apparatus of claim 1 wherein said message parser comprises:
   a parser processing unit responsive to said message signals for developing said outgoing message component signals from said incoming message signals; and
   an alterable parser control memory interacting with said parser processing unit for storing a sequence of instructions to control operations of said parser processing unit.

3. The apparatus of claim 2 wherein said sequence of instructions includes a branch instruction for enabling said parser processing unit to execute different ones of said instructions, based on values of said message signals.

4. The apparatus of claim 1 wherein said message assembler comprises:
   an assembler processing unit responsive to said message components for developing said message signals; and
   an alterable assembler control memory interacting with said assembler processing unit for storing a sequence of instructions to control operations of said assembler processing unit.

5. The apparatus of claim 4 wherein said sequence of instructions includes a branch instruction for enabling said parser processing unit to execute different ones of said instructions, based on values of said message signals.

6. The apparatus of claim 4 wherein said sequence of instructions comprises instructions drawn from a set of less than nine primitive instructions.

7. The apparatus of claim 1 wherein said central control unit comprises a plurality of finite state machines that interact with one another, that are responsive to output message component signals of said message parser through a plurality of buses, and that are further responsive to signals from said second interface, for developing input message component signals for said message assembler and output signals to said second interface.

8. The apparatus of claim 7 wherein said central control unit is further coupled to a memory for storing signals flowing to and from said second interface.

9. The apparatus of claim 7 further comprising means for storing the states of said plurality of finite state machines and for restoring said plurality of finite state machines to a previously stored set of states.

10. The apparatus of claim 1 further including means for storing within said apparatus instruction sequences for implementing said defined protocol, with said instruction sequences comprising instructions from a limited set of instructions, said set of instructions including a branch instruction.

11. Apparatus for implementing a communications protocol between a first and a second signal port, wherein said protocol calls for the carrying out of context-free processes and context-dependent processes, comprising:
   a programmable first processor connected to said first signal port and responsive to signals arriving at said first signal port for performing a first preselected set of said context-free processes;
   a programmable second processor responsive to said first processor and to signals arriving at said second signal port for performing said context-dependent processes to develop output signals of said second port and back signals derived from signals arriving at said second port; and
   a programmable third processor connected to said first signal port and responsive to said back signals for performing a second preselected set of said context-free processes to develop output signals of said first signal port.

12. The apparatus of claim 11 wherein said programmable second processor comprises:
   a data port for accepting signals from said programmable first processor, and sending signals to said third programmable processor and to said second port;
   a plurality of finite state machines interconnected with a data bus and a control bus, with said data bus connected to said data port of said programmable second processor;
   an instruction memory responsive to signals appearing at said second port for storing processing instructions for said plurality of finite state machines; and
   a dispatcher responsive to said memory for sending signals to designated finite state machines of said plurality of finite state machines via said data bus.

13. The apparatus of claim 12 wherein said plurality of finite state machines comprises a plurality of sequencers interconnected with said data bus and said control bus and a common data memory connected to said data bus that is accessed by each of said sequencers, said sequencers carrying out said context-dependent processes pursuant to said processing instructions stored in said instruction memory.

* * * * *